(12) United States Patent
Abdoulin

(10) Patent No.: US 6,351,403 B2
(45) Date of Patent: *Feb. 26, 2002

(54) SECONDARY SIDE SWITCHING REGULATOR HAVING A PHASE LOCK LOOP CONTROL CIRCUIT

(75) Inventor: Edgar Abdoulin, Woodland Hills, CA (US)

(73) Assignee: International Rectifier Corp., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/760,865

(22) Filed: Jan. 16, 2001

Related U.S. Application Data

(63) Continuation of application No. 09/398,225, filed on Sep. 17, 1999.
(60) Provisional application No. 60/101,877, filed on Sep. 25, 1998.

(51) Int. Cl.[7] .............................................. H02M 7/217
(52) U.S. Cl. ............................. 363/127; 363/89; 307/31
(58) Field of Search ..................... 363/89, 127; 307/31, 307/39

(56) References Cited

U.S. PATENT DOCUMENTS 5,925,278 A * 7/1999 Hirst ........................... 219/662
6,026,005 A * 2/2000 Abdoulin ..................... 363/89

* cited by examiner

Primary Examiner—Peter S. Wong
Assistant Examiner—Gary L. Laxton
(74) Attorney, Agent, or Firm—Ostrolenk, Faber, Gerb & Soffen, LLP

(57) ABSTRACT

A switching power converter for producing regulated D.C. power at two or more voltages. First and second regulation circuits including switching elements are connected across the secondary side of a transformer. A control circuit including a phase lock loop provides a first timing signal in leading relation to the AC input, and a delay circuit which provides a second timing circuit in delayed relation to the first timing signal. A logic circuit is responsive to the first and second timing signals to provide drive signals for the switching elements. The regulation circuits each include a first switching element having a power terminal coupled to the secondary winding and another power terminal is coupled to an intermediate node. A second switching element has a power terminal coupled to the intermediate node and another power terminal coupled to a common node. An inductor is coupled from the intermediate node to an output node. The control circuit delivers drive signals to control terminals of the switching elements to switch the switching elements on and off such that first and second regulated voltages appear between the first and second output nodes and the common node, respectively.

9 Claims, 9 Drawing Sheets

SATURABLE REACTOR (MAG AMP) CIRCUIT

N CHANNEL MOSFET PLUS SERIES DIODE

TIMING DIAGRAM

AC SWITCH APPLICATION

GATE DRIVE TIMING DIAGRAM WITH AC SWITCHES

CONTROLLER PINOUT REQUIREMENTS (28 PINS)

SECONDARY SIDE SWITCHING REGULATOR HAVING A PHASE LOCK LOOP CONTROL CIRCUIT

CROSS REFERENCE TO RELATED APPLICATIONS

This application is a continuation of copending application Ser. No. 09/398,225, filed Sep. 17, 1999.

This application is based on and claims priority to U.S. Provisional Patent Application No. 60/101,877, filed Sep. 25, 1998, entitled Double Ended Converter, the entire disclosure of which is hereby incorporated by reference. This application is related to U.S. patent application No. 09/084,768, filed May 26, 1998, now U.S. Pat. No. 6,025,005, issued Feb. 15, 2000, entitled Single Ended Forward Converter With Synchronous Rectification And Delay Circuit In Phase-Locked Loop, the entire disclosure of which is hereby incorporated by reference.

BACKGROUND OF THE INVENTION

1. Field of Invention

The present invention relates to switching power converter circuits employing secondary side regulation and, more particularly, to double ended switching power converters employing secondary side regulation circuitry to produce dual and/or interleaved outputs.

2. Related Art

FIGS. 1–4 are schematic diagrams showing power converter circuits employing secondary side regulation to produce two output voltages Vout1 and Vout2.

FIG. 1 employs a saturable reactor (mag amp) circuit including a transformer XFRMR (only the secondary winding being shown) coupled to two output regulation circuits. Each regulation circuit includes a series coupled saturable inductor L3, L4 connected from one end of the XRFMR to a shunt diode D1, D2, respectively. First transistors Qa, Qc are coupled in series with the saturable inductors L3, L4, respectively, with their drains terminating at nodes from which second transistors Qb, Qd are respectively connected in a shunt relationship to ground. Output filter inductors L1, L2 are coupled from the common nodes of Qa, Qb, and Qc, Qd, respectively, to filter capacitors C1 and C2. The regulated output voltages Vout1 and Vout2 are taken across filter capacitors C1 and C2, respectively.

A control circuit suitable for controlling diodes D1, D2 and transistors Qa, Qb, Qc, and Qd may be selected from any of the known circuits as would be readily apparent to one skilled in the art.

FIG. 2 shows a schematic diagram for another switching power converter circuit employing secondary side regulation. While the output filter configuration of the circuit shown in FIG. 2 is the same as that shown in FIG. 1, the arrangement of the regulation circuit elements differs. In particular, a single series diode D1 is employed instead of saturable inductors L3, L4 and shunt diodes D1 and D2. Further, transistors Qa and Qc are both coupled in series with diode D1 where the drains of transistors Qa and Qc are coupled together. The sources of transistors Qa and Qc are coupled to shunt transistors Qb and Qd, respectively. The regulated output voltages Vout1 and Vout2 are taken across output filter capacitors C1 and C2, respectively.

A control circuit suitable for providing control signals to transistors Qa, Qb, Qc and Qd may be selected from any of the known circuits as would be apparent to one skilled in the art in view of the above disclosure.

FIG. 3 shows a schematic diagram of yet another switching power converter circuit employing secondary side regulation. In that circuit, back-to-back transistors Qa1 and Qa2 are coupled in series between the XFRMR and the output filter inductor L1. Transistor Qb provides a shunt circuit from the back-to-back transistors to ground. Similarly, back-to-back transistors Qc1 and Qc2 are coupled in series between the XFRMR and the output filter inductor L2, with transistor Qd providing a shunt circuit to ground. The regulated output voltages Vout1 and Vout2 are taken across filter capacitors C1 and C2, respectively. A control circuit suitable for providing control signals to transistors Qa1, Qa2, Qb, Qc1, Qc2, and Qd may be selected from any of the known circuits as would be apparent to one skilled in the art having viewed the above disclosure.

FIG. 4 shows a schematic diagram of still another switching power converter circuit employing secondary side regulation. The circuit of FIG. 4 is substantially similar to the circuit of FIG. 3 except that back-to-back transistors Qa1 and Qa2 are replaced with an AC switch Qac1 and back-to-back transistors Qc1 and Qc2 are replaced with AC switch Qac2.

There is, however, a need in the art for a new circuit topology and control method to obtain secondary side regulation which results in improvements in cost and efficiency.

SUMMARY OF THE INVENTION

The present invention includes a switching power converter, comprising:

- a secondary side transformer winding having first and second ends across which an AC voltage is inducible;
- a first regulation circuit including: a first switching element having a power terminal coupled to the first end of the secondary side transformer winding and another power terminal coupled to a first intermediate node; a second switching element having a power terminal coupled to the first intermediate node and another power terminal coupled to a common node; and a first inductor coupled from the first intermediate node to a first output node;
- a second regulation circuit including: a third switching element having a power terminal coupled to the second end of the secondary side transformer winding and another power terminal coupled to a second intermediate node; a fourth switching element having a power terminal coupled to the second intermediate node and another power terminal coupled to the common node; and a second inductor coupled from the second intermediate node to a second output node; and
- a control circuit operable to deliver respective drive signals to respective control terminals of the first, second, third, and fourth switching elements such that the switching elements turn on and off in such a manner that first and second regulated voltages appear between the first and second output nodes and the common node, respectively.

Other objects, features, and advantages will be apparent to those skilled in the art from the disclosure herein.

BRIEF DESCRIPTION OF THE DRAWINGS

For the purpose of illustrating the invention, there are shown in the drawing forms which are presently preferred, it being understood, however, that the invention is not limited to the precise arrangements and instrumentalities shown.

DETAILED DESCRIPTION OF THE PREFERRED EMBODIMENTS OF THE PRESENT INVENTION

Figure 5:
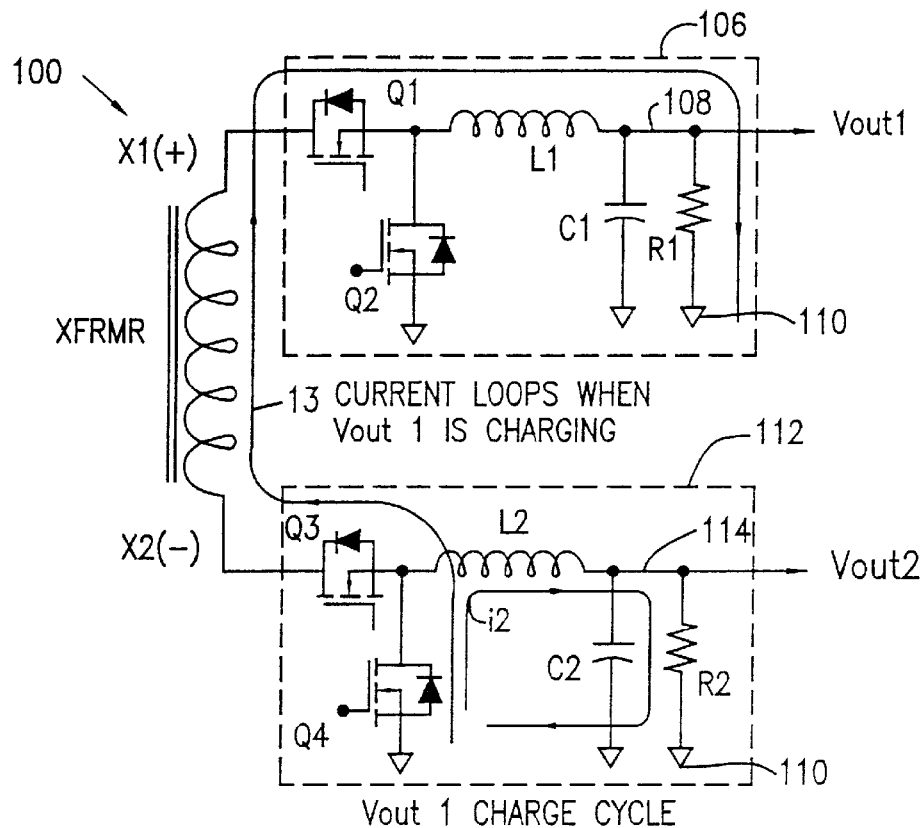
FIG. 5 is a schematic diagram showing a switching power converter topology employing secondary side regulation in accordance with the present invention, the converter being in one operating state.

Referring now to the drawings wherein like numerals indicate like elements, there is shown in FIG. 5 a schematic diagram of a switching power conversion circuit 100 in accordance with one aspect of the present invention. Circuit 100 includes a primary side circuit (not shown) having a switching element and a primary side transformer winding coupled to one another to cause alternating current to flow in the primary side transformer winding. The primary side transformer winding is linked to the secondary side transformer winding XFRMR via transformer action such that alternating current (and therefor an AC voltage) appears at secondary side transformer winding XFRMR.

Secondary side transformer winding XFRMR includes a first end X1 and a second end X2. Those skilled in the art will appreciate that an AC voltage is inducible across first end X1 and second end X2 of XFRMR. The first end X1 may be positive with respect to the second end X2 during first partial cycles of the AC voltage. The first end X1 of XFRMR may be negative with respect to the second end X2 during second partial cycles of the AC voltage, where the first and second partial cycles are separated by transitions (see FIG. 6, X1 and X2 waveforms).

A first regulation circuit 106 is coupled to the first end X1 of the XFRMR to produce a regulated output voltage Vout1 between output node 108 and ground (or common potential) 110. A second regulation circuit 112 is coupled to the second end X2 of the XFRMR to produce regulated output voltage Vout2 between output node 114 and ground 110.

First regulation circuit 106 includes transistors Q1, Q2 (e.g., switching elements, preferably N-channel MOSFET transistors), filter inductor L1, filter capacitor C1, and load resistor R1 (optional). Transistor Q1, shown as an N-channel MOSFET, includes a first power terminal (the drain) coupled to the first end X1 of the XFRMR and a second power terminal (the source) coupled to one end of the filter inductor L1. Transistor Q2, also shown as an N-channel MOSFET, includes a first power terminal (the drain) coupled from the source of transistor Q1 and a second power terminal (the source) coupled to ground 110. Capacitor C1 and resistor R1 are coupled in a shunt configuration from node 108 to ground 110.

The second regulation circuit 112 includes transistors Q3 and Q4 (also preferably N-channel MOSFET transistors), filter inductor L2, filter capacitor C2, and load resistor R2 (optional). Transistors Q3 and Q4 are coupled to the second end X2 of the XFRMR in a similar way that Q1 and Q2 were coupled to the first end X1 of the XFRMR. Transistors Q3 and Q4, like transistors Q1 and Q2, are controlled via the control circuit (not shown) such that they commutate in synergy with the alternating voltage and current appearing at XFRMR.

Figure 6:
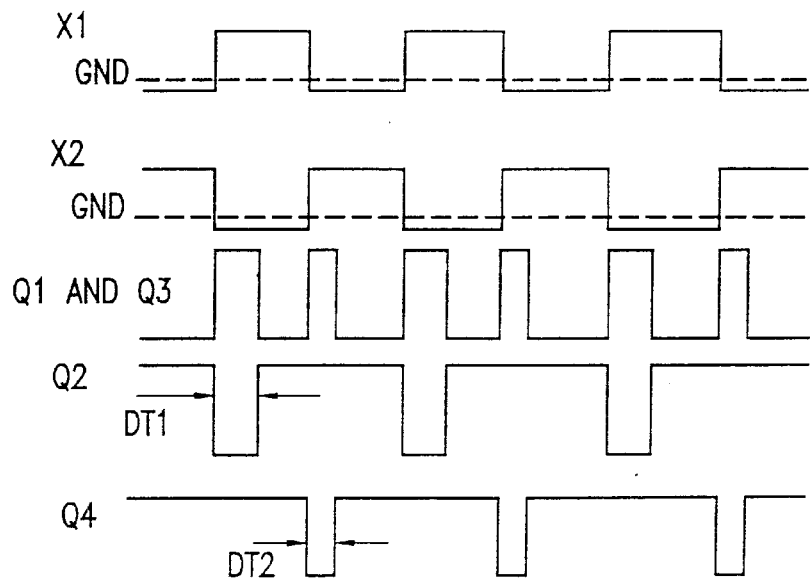
FIG. 6 is a timing diagram illustrating control signals provided by a control circuit to the converter of FIG. 5.
Figure 7:
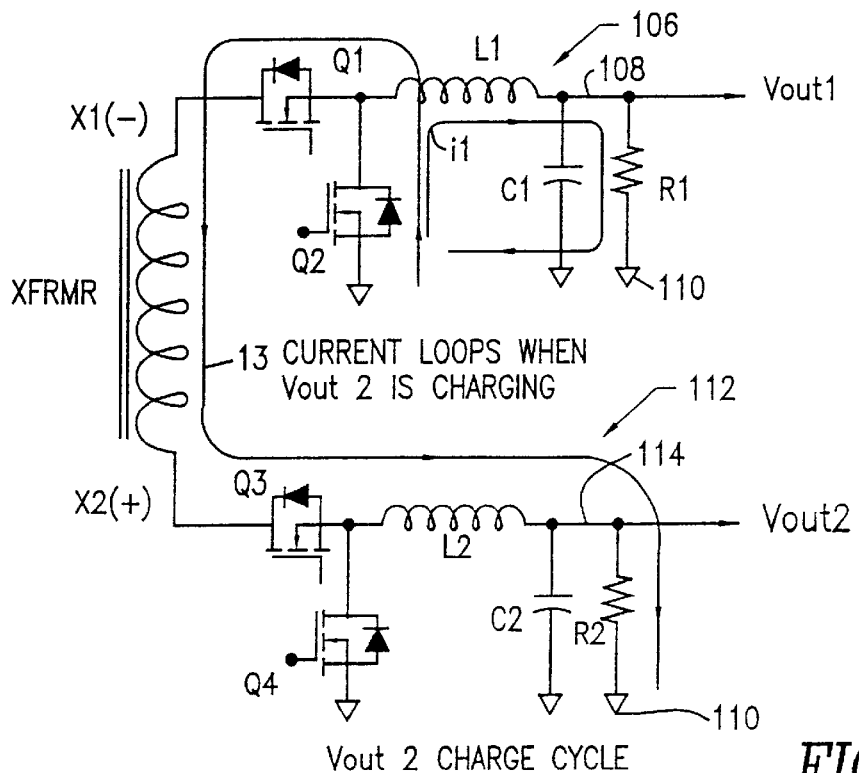
FIG. 7 is a schematic diagram showing the converter of FIG. 5 during a different operating state.
Figure 8:
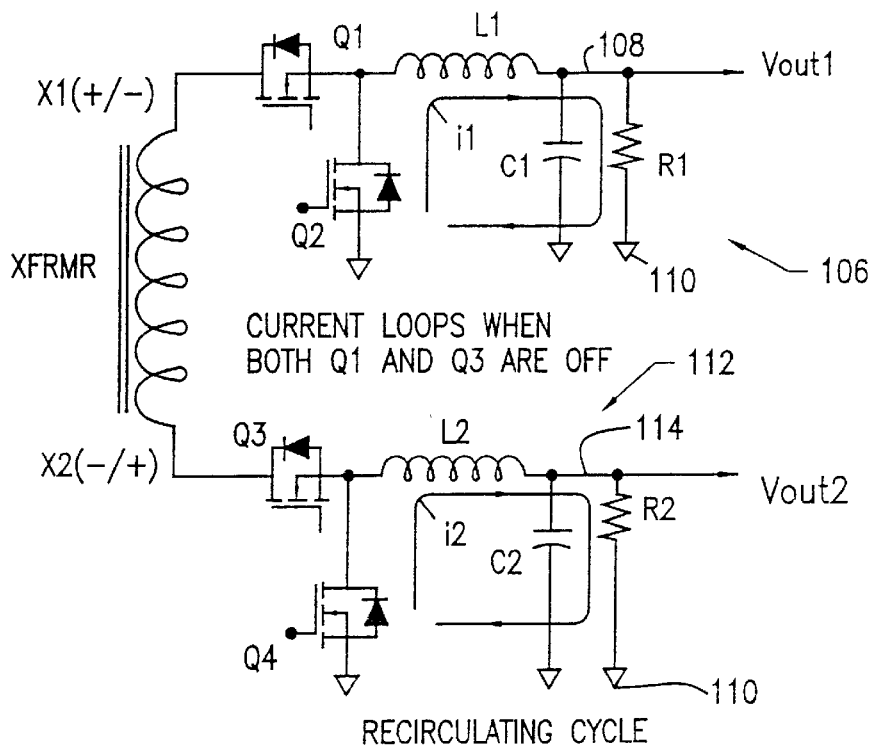
FIG. 8 is a schematic diagram showing the circuit of FIG. 5 during yet another operating state.

FIGS. 5, 7 and 8 illustrate the current paths of i1, i2 and i3 throughout the circuit during different operating states of the converter 100. FIG. 6 is a timing diagram illustrating the control circuit conditions and control signals (or drive signals) provided to Q1, Q2, Q3 and Q4 during these operating states. In particular, FIG. 6 shows the waveforms of the voltages that appear at nodes X1 and X2 during the different periods of operation. As shown, X1 is sometimes positive with respect to X2 (i.e., during the first partial cycles of the AC voltage) and X1 is sometimes negative with respect to X2 (i.e., during the second partial cycles of the AC voltage).

Preferably, the control circuit for Q1, Q2, Q3 and Q4 is operable to bias the transistors on and off in such a way to define at least three operating states, namely: (i) a first state when Q1, Q3, and Q4 are ON and Q2 is OFF; (ii) a second state when Q1 and Q3 are OFF and Q2 and Q4 are ON; and (iii) a third state when Q1, Q3, and Q2 are ON and Q4 is OFF.

FIG. 5 illustrates current paths during a first partial cycle of the AC voltage, i.e., when X1 is positive with respective to X2, denoted X1(+) and X2(−). There are two operating states during the X1(+), X2(−) partial cycle, the first shown in FIG. 5 and a second shown in FIG. 8. The first operating state exists when Q1, Q3, and Q4 are biased ON and Q2 is biased OFF. The first operating state lasts for a time period identified as DT1 (or delay time 1) in FIG. 6. During this operating state, charging current i3 flows from ground to Vout1 through transistor Q4, transistor Q3, XFRMR, transistor Q1, and filter inductor L1. Current i3 charges Vout1 through inductor L1 and may then flow through, for example, R1 to ground 110.

A recirculating current i2 flows through inductor L2 during the first operating state. Recirculating current i2 flows from ground 110 to Vout2 through transistor Q4 and filter inductor L2. Current i2 is available to flow through, for example, R2 to ground 110. It is noted that no recirculating current i1 flows in first regulation circuit 106 during this operating state.

With reference to FIGS. 6 and 8, the second operating state exists when transistors Q1 and Q3 are biased OFF and transistors Q2 and Q4 are biased ON. During this operating state, recirculating current i1 flows from ground 110 to Vout1 through transistor Q2 and filter inductor L1. Recirculating current i2 also flows during this operating cycle. It is noted that substantially no charging current i3 flows through XFRMR during the second operating cycle.

With reference to FIGS. 6 and 7, current paths are shown during a second partial cycle of the AC voltage, i.e., when X1 is negative with respect to X2, denoted X1(-) and X2(+). There are two operating states during X1(-), X2(+), one of the operating states is the third operating state (shown in FIG. 7) and the other operating state is the second operating state (shown in FIG. 8). The third operating state exists when transistor Q1, Q2 and Q3 are biased ON and transistor Q4 is biased OFF. The third operating state lasts for a time period identified as DT2 (or delay time 2) in FIG. 6. During this operating state, recirculating current i1 flows from ground 10 through transistor Q2 and filter inductor L1. Further, current 13 flows from ground 110 to Vout2 through transistor Q2, transistor Q1, XFRMR, transistor Q3, and filter inductor L2. Current i3 charges Vout2 through inductor L2. It is noted that no recirculating current i2 flows during this operating cycle.

Referring again to FIGS. 6 and 8, the second operating state exists when transistors Q1 and Q3 are biased OFF and transistor Q2 and Q4 are biased ON. During this operating state recirculating currents i1 and 12 again flow in the first and second regulation circuits 106, 112, respectively.

The control circuit (not shown) is preferably operable to produce drive signals such that transistors Q1, Q2, Q3, and Q4 are: (i) initially in the first state and transition to the second state during the first partial cycles of the AC voltage (i.e., when X1 is positive with respect to X2); (ii) transition from the second state to the third state substantially coincidently with the transitions from the first to second partial cycles of the AC voltage (i.e., when X1 and X2 switch polarity); and (iii) initially in the third state and transition to the second state during the second partial cycles of the AC voltage (i.e., when X2 is positive with respect to X1).

With reference to FIG. 6, each drive signal for transistors Q1, Q2, Q3 and Q4 includes a plurality of voltage pulses, each voltage pulse being defined by: (i) an ON potential which biases a respective transistor ON; (ii) an OFF potential which biases the respective switching element OFF; (iii) an ON edge located at an OFF to ON potential transition; and (iv) an OFF edge located at an ON to OFF potential transition.

It is noted that the control circuit is operable to produce a drive signal for transistor Q4 which has OFF edges which are substantially coincident with the transitions from the first to second partial cycles of the AC voltage. The control circuit produces drive signals for Q1 and Q3 such that the ON edges of the voltage pulses for those drive signals are substantially coincident with (i) the transitions from the second to first partial cycles of the AC voltage; and (ii) the transitions from the first to second partial cycles of the AC voltage.

The widths of the voltage pulses of the drive signals may be varied to regulate the voltages Vout1 and Vout2. In particular, the ON edges of the drive signals for transistors Q2 and Q4 may be moved relative to the OFF edges (thereby moving relative to the transitions of the AC voltage).

The control circuit is preferably operable to produce drive signals such that (i) the OFF edges of the drive signal for transistor Q2 are substantially coincident with the transitions from the second to first partial cycles of the AC voltage; (ii) the ON edges of the drive signal for transistor Q2 are substantially coincident with some of the OFF edges of the drive signals for transistors Q1 and Q3; and (iii) the ON edges of the drive signal for transistor Q4 are substantially coincident with other OFF edges of the drive signals for transistors Q1 and Q3.

The above sequence of drive signals (and operating states) repeats during successive periods of X1 and X2. It is noted that during the first operating state, transistor Q4 carries both recirculating current i2 and charging current i3. Similarly, during the third operating state, transistor Q2 carries both recirculating current i1 and charging current i3. Consequently, transistors Q2 and Q4 may have to be sized larger than transistors Q1 and Q3.

It has been found that the circuit configuration shown in FIG. 5 operates best when outputs Vout1 and Vout2 share a common ground 110. Further, it has been found that the efficiency of the switching power converter circuit 100 is maximized when the maximum current outputs from Vout1 and Vout2 are substantially similar. For example, when Vout1 is 5 volts DC at 30 amps, the output current available from Vout2 should be of a similar magnitude, for example, 3.3 volts DC at 25 amps.

Among the advantages of utilizing the circuit shown in FIG. 5, are that four standard transistors (such as N-channel MOSFETs) may be utilized rather than complex back-to-back transistors or AC switches. Further, the circuit may be used at high frequencies and may use AC switches if desired (discussed below). Still further, a single controller circuit (discussed below) may be used while achieving two independently controllable output voltages Vout1 and Vout2. Indeed, first and second regulation circuits 106, 112 may be independently turned ON or OFF.

Figure 9:
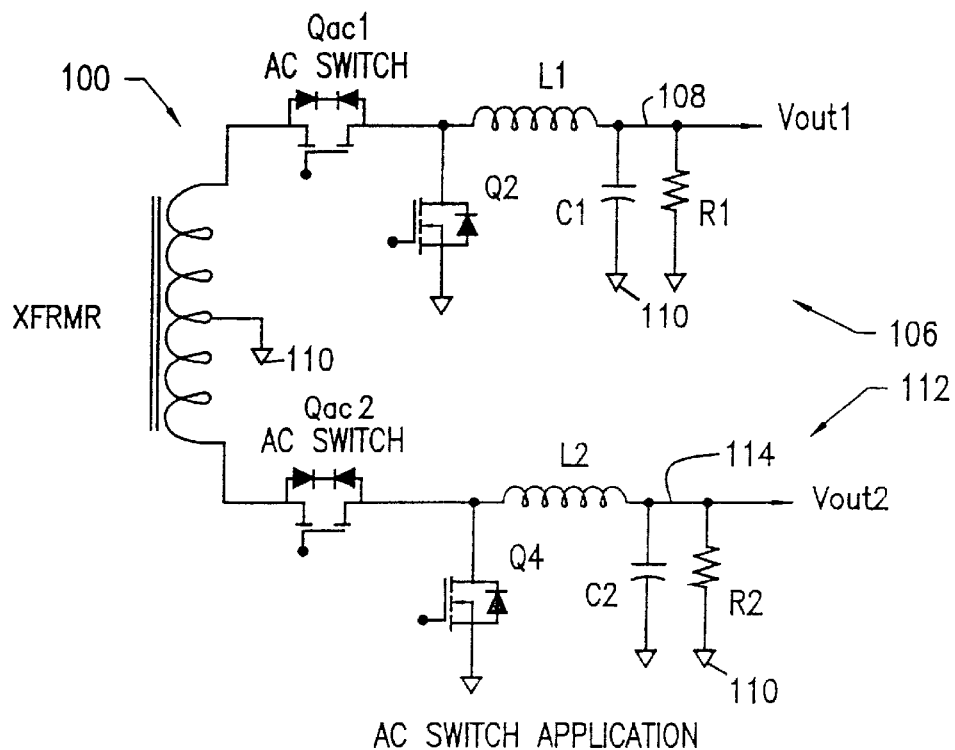
FIG. 9 is a schematic diagram showing a switching power converter employing secondary side regulation according to another aspect of the present invention.
Figure 10:
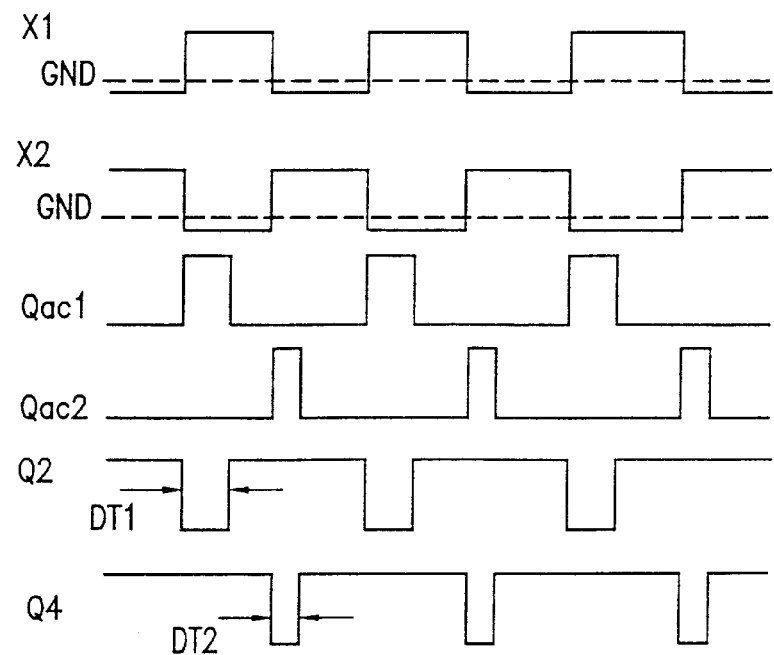
FIG. 10 is a timing diagram showing control signals provided by a control converter to the circuit of FIG. 9.

With reference to FIGS. 9 and 10, transistors Q1 and Q3 may be replaced with AC switches Qac1 and Qac3, respectively. In this configuration, the secondary side transformer winding XFRMR is center tapped with the center tap coupled to ground 110. FIG. 10 shows a timing diagram illustrating the control sequence for transistors Qac1, Q2, Qac3, and Q4 with respect to the AC voltage across XFRMR.

Figure 11:
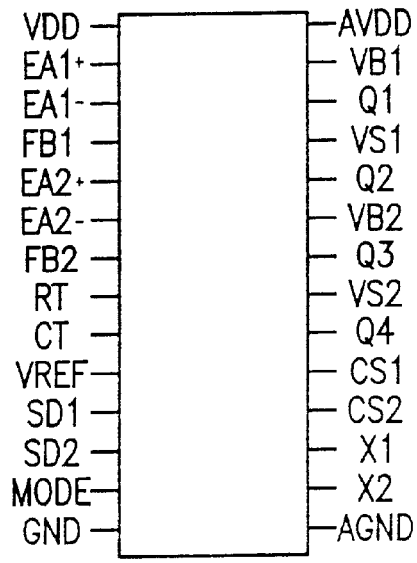
FIG. 11 is a block diagram showing an integrated circuit and pinout configuration for a control circuit suitable for use with the converters of FIGS. 4–10.

Reference is now made to FIG. 11 which shows an integrated circuit suitable for use as the controller for controlling the converter of FIGS. 5 and 9. It is preferred that the controller include 28 pins described in Table 1.

TABLE 1

| Pin | Description |
| --- | --- |
| AVDD | Analog power (Drivers) |
| VDD | Logic power |
| AGND | Analog ground |
| GND | Logic ground |

TABLE 1-continued

| Pin | Description |
| --- | --- |
| EA1+ | Err amp #1 plus input |
| EA1− | Err amp #1 negative input |
| FB1 | Err amp #1 output |
| EA2+ | Err amp #2 plus input |
| EA2− | Err amp #2 negative input |
| FB2 | Err amp #2 output |
| RT | Timing resistor |
| CT | Timing Capacitor |
| VREF | Interal reference |
| SD1 | PS #1 Shut down |
| SD2 | PS #2 shut down |
| MODE | Mode=0: Nchannel MOSFETs |
| X1 | Transformer High side input |
| X2 | Transformer low side input |
| CS1 | PS #1 Current sense |
| CS2 | PS #2 Current sense |
| VB1, VB2 | High side floating supply bus |
| Q1, Q3 | High side Nchannel gate outputs |
| VS1, VS2 | High side floating supply common |
| Q2, Q4 | Low side gate driver outputs |

Pins EA1+, EA1−, FB1, EA2+, EA2−, and FB2 are provided, among other reasons, to permit frequency compensation and stability adjustments, the design details of which would be apparent to one skilled in the art from the above teaching. Pins RT and CT are provided to adjust the frequency of the controller. Pins SD1 and SD2 are provided to permit asynchronous or synchronous shut-down of the first and/or second regulation circuits 106, 112. Pin MODE is provided such that either N-channel MOSFETs or AC switches may be employed using the same controller. Indeed, when the MODE pin is taken to a logic zero, the controller operates to provide the timing control signals shown in FIG. 6. When the MODE pin is taken to logic 1, the controller provides the control signals shown in FIG. 10.

Loss measurements for the circuits of FIGS. 1–5 and 9 were taken under the following conditions:
(I) the XFRMR voltage being 20 volts DC at 50% duty cycle;
(ii) Vout1 being 5 volts DC and Vout2 being 3.3 volts DC;
(iii) current output from Vout1 being 30 amps DC and the current output from Vout2 being 25 amps DC;
(iv) DT1 being 0.25 duty cycle and DT2 being 0.165 duty cycle;
(v) the forward voltage drop of any Shottkey diodes being 0.35 volts DC;
(vi) the ON resistance of any AC switches being 0.009 ohms; and
(vii) the ON resistance of any MOSFET transistors being 0.003 ohms.

Figure 1:
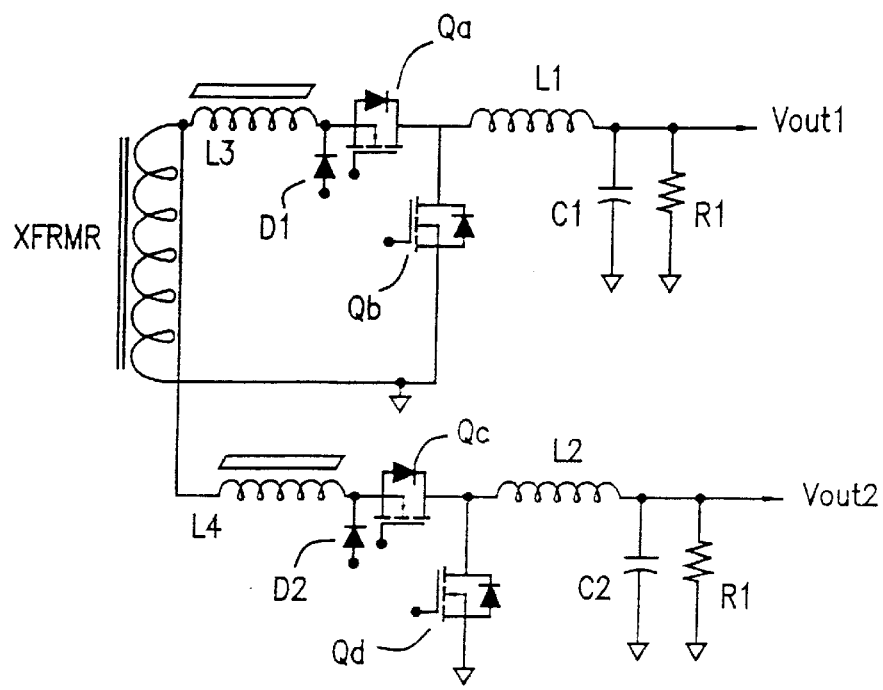
FIG. 1 is a schematic diagram showing a first switching power converter employing secondary side regulation according to the prior art.
Figure 2:
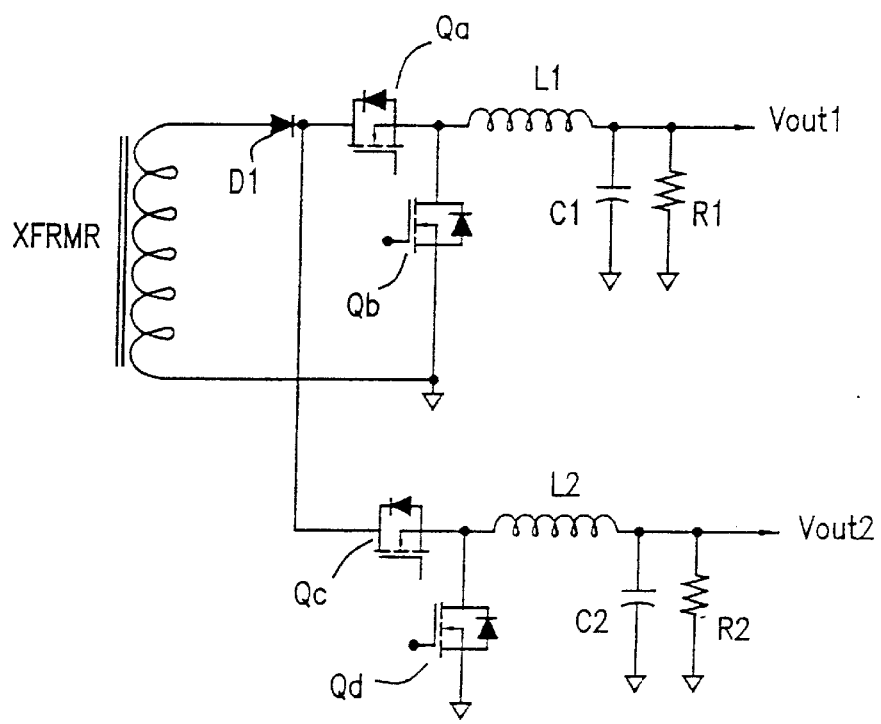
FIG. 2 is a schematic diagram showing a second switching power converter employing secondary side regulation according to the prior art.
Figure 3:
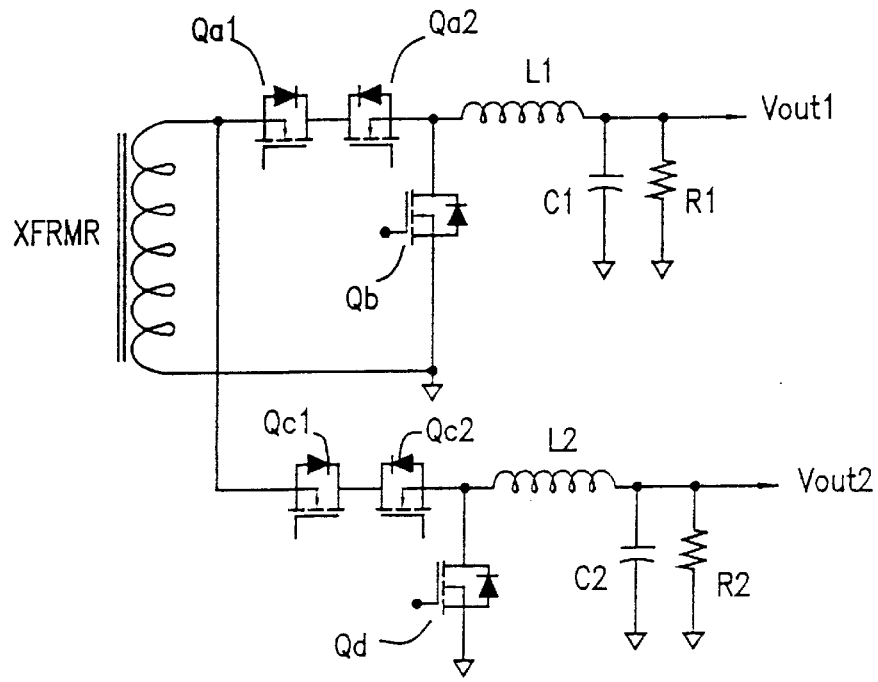
FIG. 3 is a schematic diagram showing a third switching power converter employing secondary side regulation according to the prior art.
Figure 4:
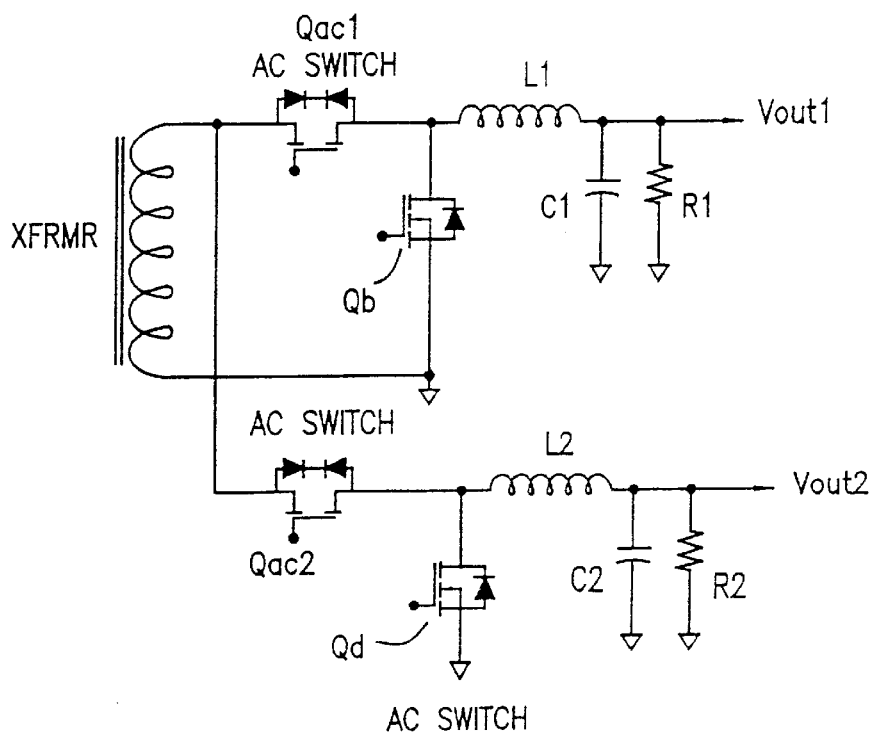
FIG. 4 is a schematic diagram showing a fourth switching power converter employing secondary side regulation according to the prior art.

The total loss for the power conversion circuits of FIGS. 1 and 2 was found to be 7.115 Watts at a normalized "cost" of 4.7. The total loss for the power conversion circuit of FIG. 3 was found to be 3.266 Watts at a normalized "cost" of 6.0. The total loss for the power conversion circuit of FIG. 4 was found to be 3.485 Watts at a normalized "cost" of 4.4. The total loss of the power conversion circuit of FIGS. 5 and 9 was found to be 3.889 Watts at a normalized "cost" of 4.0.

Figure 12:
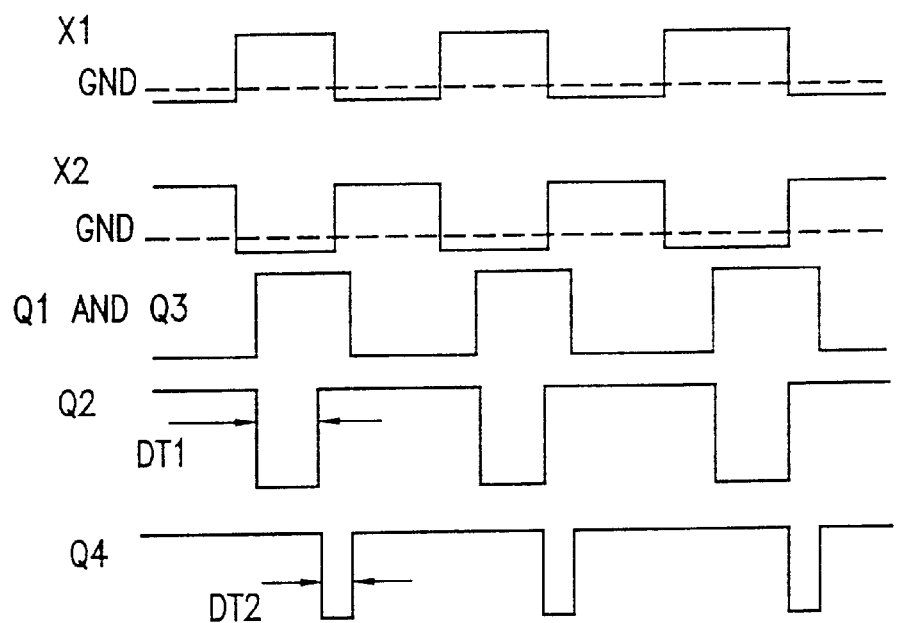
FIG. 12 is a timing diagram illustrating alternative control signals provided by a control circuit to the converter of FIGS. 5, 7, and 8.

Reference is now made to FIG. 12 which illustrates timing signals which are preferably produced by a control circuit (not shown) suitable for providing drive signals to the power converter topology of FIGS. 5, 7, and 8 according to another aspect of the present invention. In particular, the control circuit is preferably operable to produce the drive signals such that the transistors Q1, Q2, Q3, and Q4: (i) transition from the second state to the first state during the first partial cycles of the AC voltage (i.e., when X1 is positive with respect to X2); (ii) transition from the first state to the third state substantially coincidently with the transitions from the first to second partial cycles of the AC voltage; (iii) transition from the third state to the second state during the second partial cycles of the AC voltage (i.e., when X2 is positive with respect to X1); and (iv) remain in the second state through the transitions from the second to first partial cycles of the AC voltage.

As was the case with the control circuit for FIG. 6, the control circuit for FIG. 12 is preferably operable to produce a dive signal for transistor Q4 having OFF edges which are substantially coincident with the transitions from the first to second partial cycles of the AC voltage. Unlike the control circuit for FIG. 6, the control circuit for FIG. 12 is preferably operable to produce a drive signal for transistor Q2 having ON edges which are substantially coincident with the transitions from the first to second partial cycles of the AC voltage. Thus, the ON edges of the drive signal for Q2 are substantially coincident with the OFF edges of the drive signal for transistor Q4. Furthermore, the OFF edges of the drive signal for Q2 are substantially coincident with the ON edges of the drive signals for transistors Q1 and Q3, while the ON edges of the drive signal for transistor Q4 are substantially coincident with the OFF edges of the drive signals for transistors Q1 and Q3.

Figure 13:
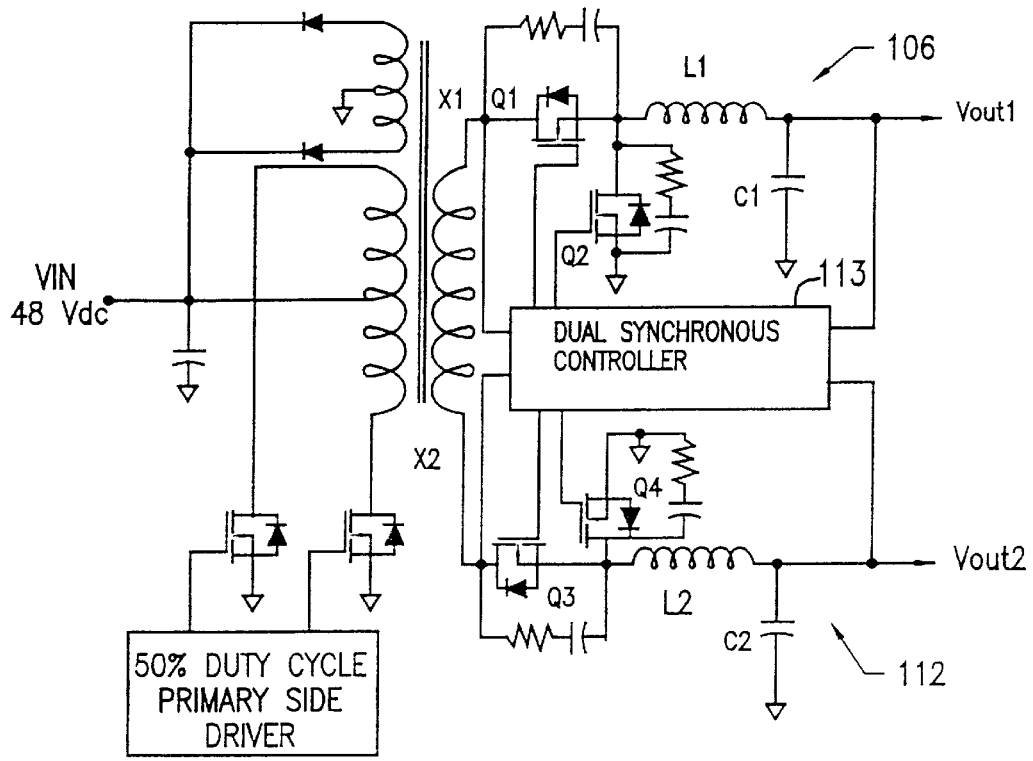
FIG. 13 is a circuit diagram illustrating a switching power converter employing secondary side regulation according to another aspect of the present invention, the converter operating in accordance with the control signals illustrated in FIG. 12.

FIG. 13 is a circuit diagram illustrating a power converter employing the topology of FIG. 5 with additional details shown. In particular, a primary side of the converter includes switching elements (e.g., N-channel MOSFET transistors) operating at a 50% duty cycle and driving a center tapped primary side transformer winding, where the center tap is connected to a source of DC voltage (i.e., VDC). A reset transformer winding is also provided. A control circuit (in particular, a dual synchronous controller) 113 receives input signals from Vout1, Vout2, X1, and X2. The control circuit 113 provides drive signals to transistors Q1, Q2, Q3, and Q4 (each transistor including a resistor/capacitor snubber circuit). Preferably, the controller 113 provides drive signals illustrated in FIG. 12.

Figure 14:
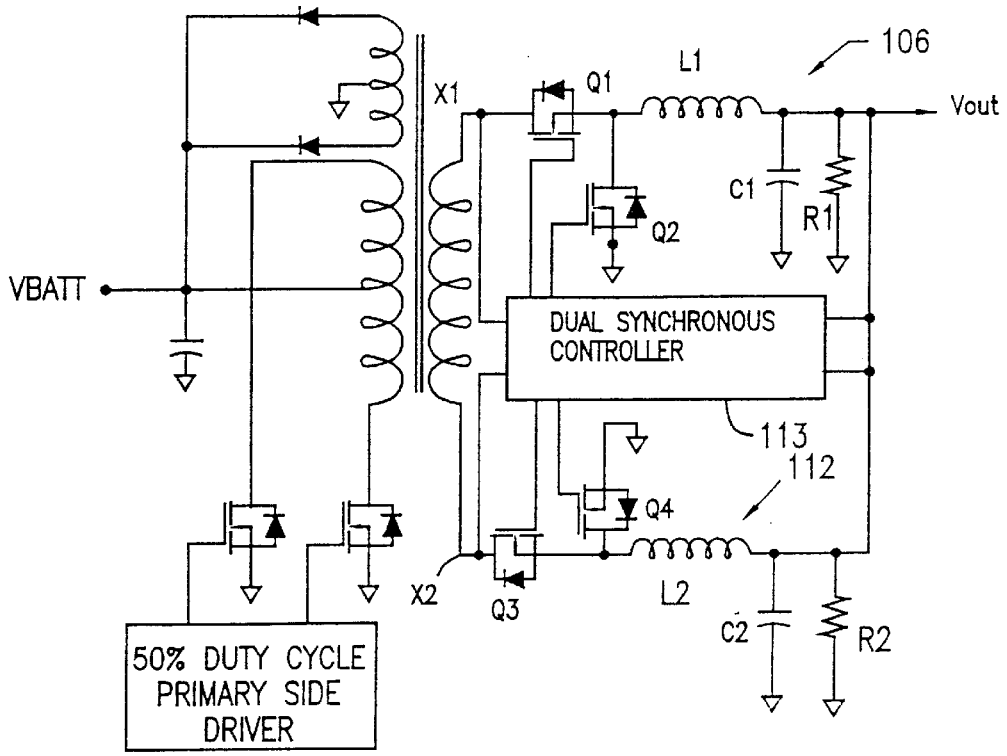
FIG. 14 is a schematic diagram showing a switching power converter employing secondary side regulation according to yet another aspect of the present invention, the converter operating in accordance with the control signals illustrated in FIG. 12.

FIG. 14 illustrates a circuit diagram for a power converter employing an alternative topology of FIG. 13. In particular, the output nodes for Vout1 and Vout2 are tied together for an interleaved configuration producing a single output voltage Vout. The operation of this power converter is substantially similar to that of FIG. 13.

Figure 15:
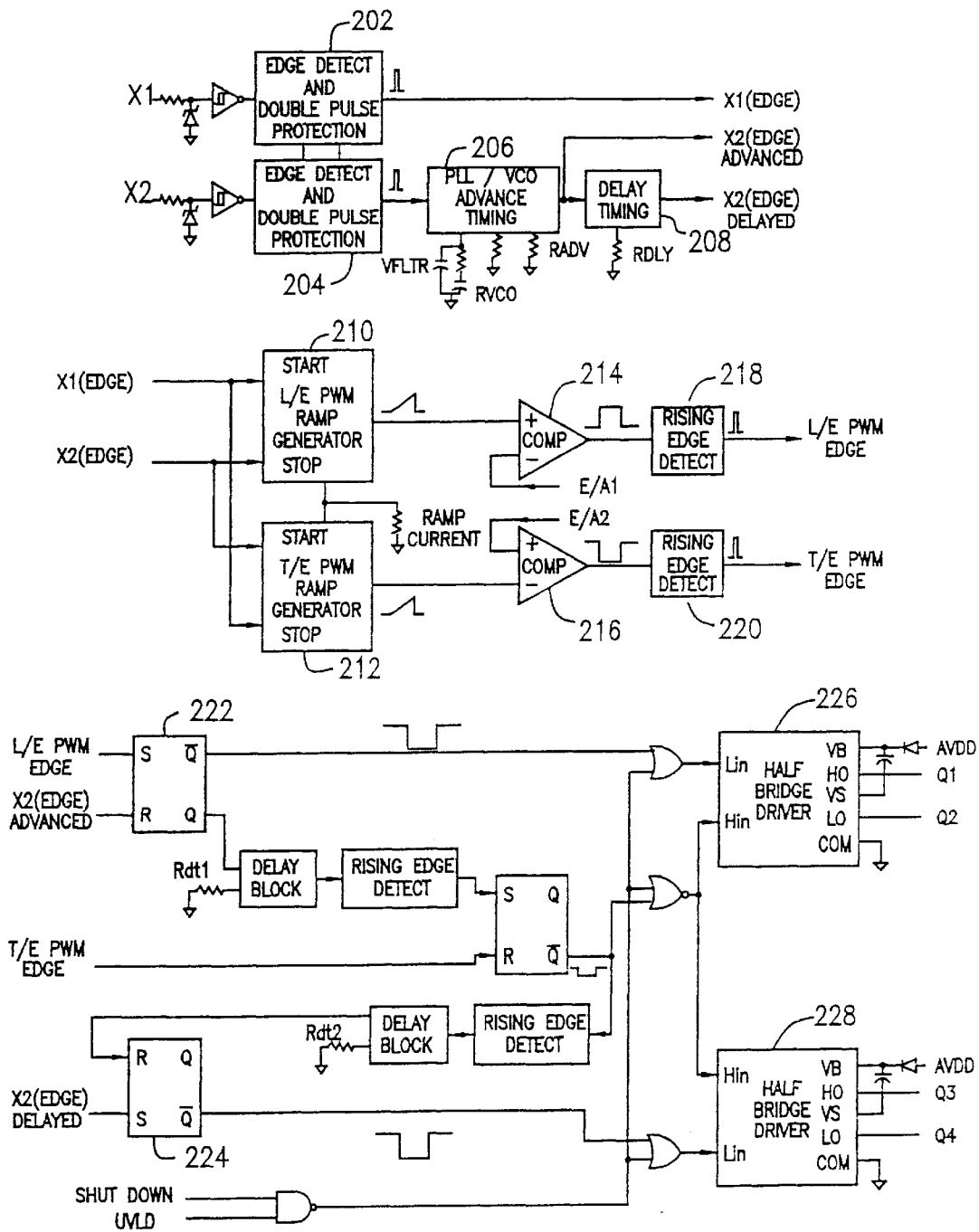
FIG. 15 is a block diagram of the control circuit of FIGS. 13 and 14.
Figure 16:
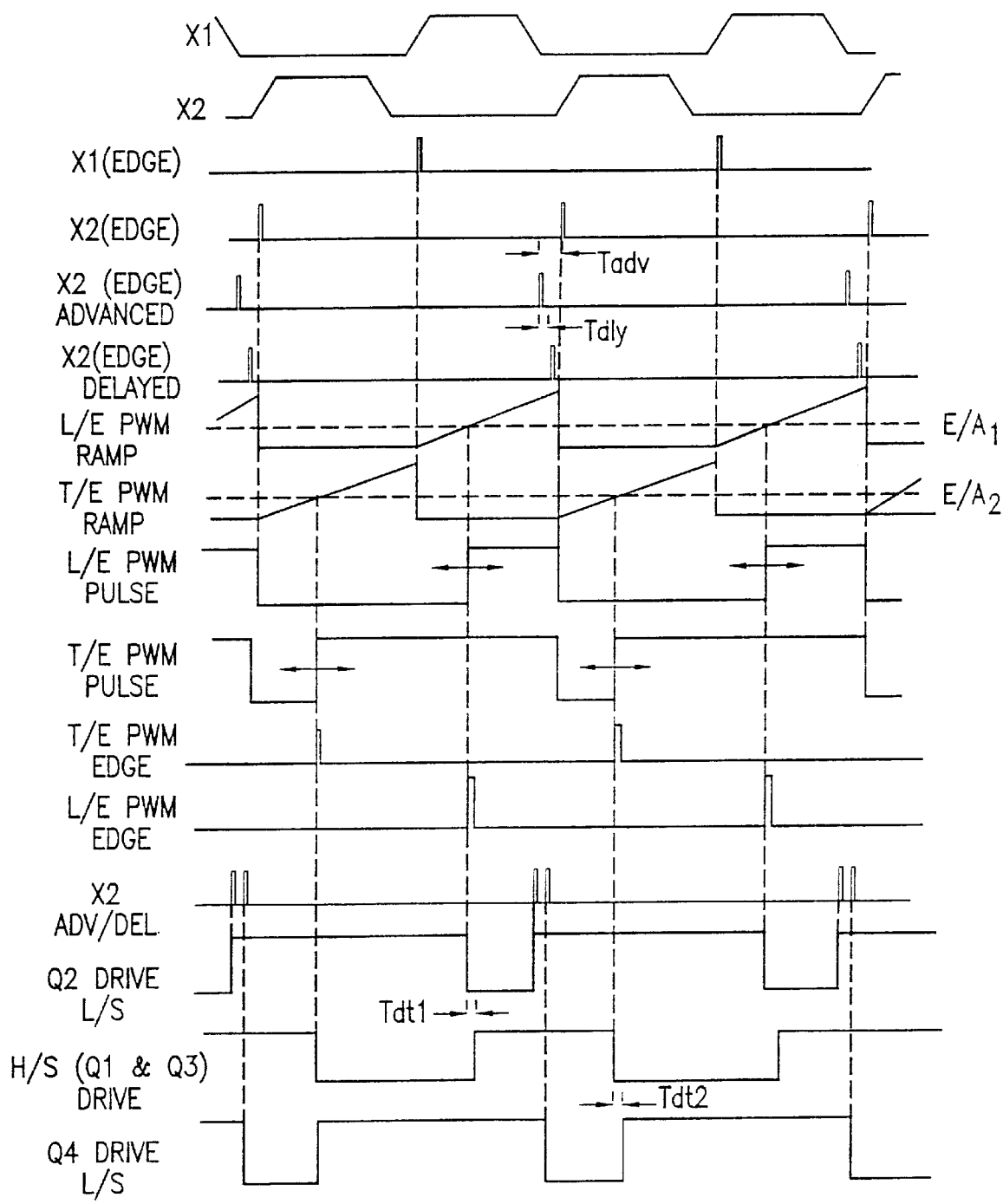
FIG. 16 is a timing diagram illustrating various signals produced by the control circuit of FIG. 15.

FIG. 15 is a circuit diagram suitable for implementing the control circuit 113 of FIGS. 13 and 14. FIG. 16 is a timing diagram illustrating certain signals within the circuit of FIG. 15. With reference to FIG. 15, X1 and X2 are amplitude limited by respective series resistors and shunt zener diodes, and buffered by respective inverting amplifiers prior to their input into edge detect and double pulse protection circuits 202, 204. Edge detect circuits 202, 204 are operable to detect the respective transitions in X1 and X2 (i.e., the transitions from first to second and second to first partial cycles of the AC voltage). Edge detect circuits 202, 204 produce pulses labeled X1 (EDGE) and X2 (EDGE) shown in FIG. 16.

A phase-lock-loop circuit (PLL) 206 receives the X2 (EDGE) signal from the edge detect circuit 204 and produces an X2 (EDGE) ADVANCED signal (see FIG. 16) which leads the X2 (EDGE) signal. A delay timing circuit 208 receives the X2 (EDGE) ADVANCED signal and produces an X2 (EDGE) DELAYED signal which lags the X2 (EDGE) ADVANCED signal but leads the X2 (EDGE) signal (see FIG. 16).

Preferably, the X2 (EDGE) ADVANCED pulse causes the OFF to ON transition of the drive signal for Q2 (Q2 DRIVE), while the X2 (EDGE) DELAYED signal causes the ON to OFF transition of the drive signal for transistor Q4 (Q4 DRIVE). Thus, the ON edge of the Q2 drive signal and the OFF edge of the Q4 drive signal are synchronized with and slightly lead the transitions from the first to second partial cycles of the AC voltage. Advantageously, the ON potentials of the Q2 drive and Q4 drive overlap slightly to compensate for any stray inductance associated with transistors Q2 and Q4 or the printed circuit board. Moreover, since the ON edge of the Q2 drive and the OFF edge of the Q4 drive lead the transitions from first to second partial cycles of the AC voltage, improved efficiency is achieved because current is not commutated in the anti-parallel diodes of switching elements Q2 and Q4. Rather, commutating current flows within the transistor channels.

With reference to FIG. 15, the X1 (EDGE) and X2 (EDGE) signals are input into ramp generating circuits 210 and 212 which produce L/E PWM RAMP and T/E PWM RAMP signals (see also FIG. 16). As is known in the art, error amplifiers (not shown) are used to compare the voltages at Vout1 and Vout2 with reference voltages. These error amplifiers produce error signals E/A1 and E/A2 (shown as dotted lines in FIG. 16). Error amplifier signals E/A1 and E/A2 are input into comparator circuits 214, 216, respectively which compare the error signals with the ramp signals produced by ramp generating circuits 210, 212. The pulsed outputs of comparator circuits 214, 216 produce L/E PWM PULSE and T/E PWM PULSE signals, respectively. As the error signal E/A1 rises and falls with respect to the L/E PWM RAMP signal, the leading edge of the L/E PWM PULSE signal moves with respect to: (i) the falling edge of the L/E PWM RAMP signal; and (ii) the initial point of the rising edge of the T/E PWM RAMP signal. Thus, the L/E PWM PULSE signal is referred to as leading edge PWM control.

As error signal E/A2 rises and falls with respect to the T/E PWM RAMP signal, the trailing edge of the T/E PWM PULSE signal moves with respect to: (i) the falling edge of the L/E PWM RAMP signal; and (ii) the initial point of the rising edge of the T/E PWM RAMP signal. Thus, the T/E PWM PULSE signal is referred to as trailing edge PWM control.

Those skilled in the art will appreciate that the L/E PWM PULSE and T/E PWM PULSE signals are utilized to derive the drive signals for transistors Q1, Q2, Q3 and Q4 using rises edge detect circuits 218, 220; flip flop circuits 222, 224; and half bridge driver circuits 226, 228. Advantageously, the leading edge PWM and trailing edge PWM control of transistors Q2 and Q4 permit transistors Q1 and Q3 to remain ON (i.e., in the third operating state) during the transitions from the first to second partial cycles of the AC voltage (see also FIG. 12), thereby resulting in lower switch loses and gate drive energy requirements for transistors Q1 and Q3.

The foregoing description of the preferred embodiments of the invention has been provided for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A switching power converter, comprising:
   a transformer including a secondary winding across which an AC voltage is inducible;
   a regulation circuit including:
      a plurality of switching elements coupled between the transformer secondary and a common node; and
      an inductor which provides an output to an output node;
   a control circuit which generates drive signals to turn the switching elements on and off in such a manner that regulated DC voltage appears between the output node and the common node,
   the control circuit including:
      a phase lock loop circuit operable to generate a first timing signal having a predetermined phase difference relative to the AC voltage across the secondary winding; and
      a logic circuit responsive to the timing signal to generate drive signals for the switching elements.

2. The switching power converter of claim 1, wherein the timing signal has a predetermined phase lead relative to the AC voltage across the secondary winding.

3. The switching power converter of claim 2, wherein:
   the control circuit further includes a delay circuit coupled to the output of the phase lock loop which produces a second timing signal having a predetermined phase delay relative to the first timing signal; and
   the logic circuit is responsive to the second timing signal to generate further drive signals for the switching elements.

4. A control circuit for a switching power converter which converts an AC voltage appearing across a secondary winding of a transformer into a regulated DC voltage, the switching power converter including a switching regulator circuit comprised of a plurality of switching elements coupled between the transformer secondary and a common node and an inductor which provides an output to an output node;
   the control circuit including:
      a phase lock loop circuit operable to generate a first timing signal having a predetermined phase difference relative to the AC voltage across the secondary winding; and
      a logic circuit responsive to the timing signal to generate drive signals for the switching elements.

5. The control circuit of claim 4, wherein the timing signal has a predetermined phase lead relative to the AC voltage across the secondary winding.

6. The control circuit of claim 5, further including a delay circuit coupled to the output of the phase lock loop which produces a second timing signal having a predetermined phase delay relative to the first timing signal, and wherein the logic circuit is responsive to the second timing signal to generate further drive signals for the switching elements.

7. A switching power converter, comprising:
   a transformer including a secondary winding across which an AC voltage is inducible;
   a first regulation circuit including:
      a first plurality of switching elements coupled between a first tap and a common node; and
      a first inductor which provides an output to a first output node;
   a second regulation circuit including:
      a second plurality of switching elements coupled between a second tap and the common node; and
      a second inductor which provides an output to a second output node; and a control circuit which generates drive signals to turn the switching elements on and off in such a manner that first and second regulated DC voltages appear between the first and second output nodes and the common node, respectively, the control circuit including:
- a phase lock loop circuit operable to generate a first timing signal having a predetermined phase difference relative to the AC voltage across the secondary winding; and
- a logic circuit responsive to the timing signal to generate drive signals for the first and second regulation circuits.

8. The switching power converter of claim 7, wherein the timing signal has a predetermined phase lead relative to the AC voltage across the secondary winding.

9. The switching power converter of claim 8, wherein:
- the control circuit further includes a delay circuit coupled to the output of the phase lock loop which produces a second timing signal having a predetermined phase delay relative to the first timing signal; and
- the logic circuit is responsive to the second timing signal to generate further drive signals for the switching elements.

* * * * *